United States Patent Office 3,485,581
Patented Dec. 23, 1969

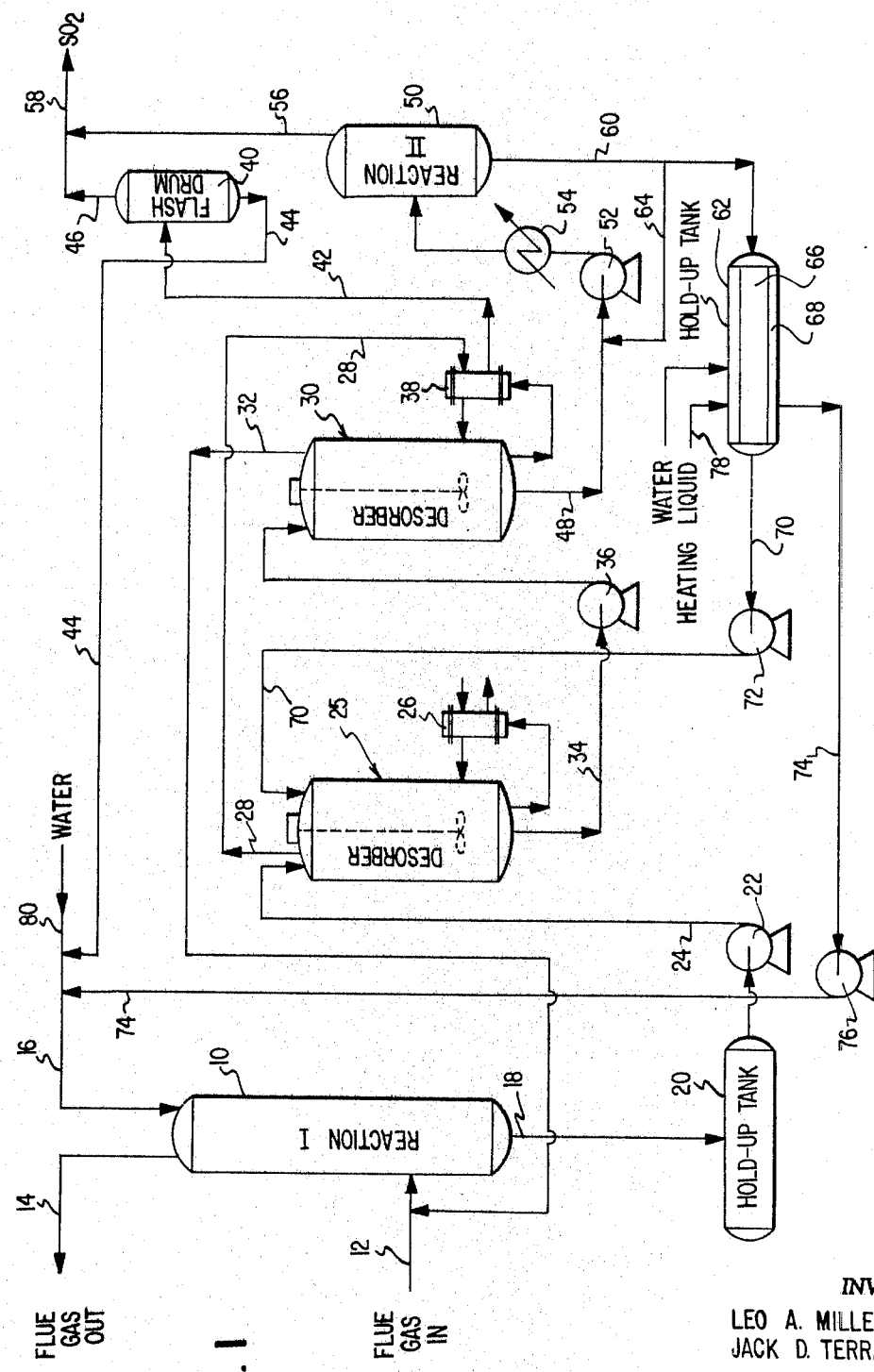
FIG. I
INVENTORS.
LEO A. MILLER
JACK D. TERRANA
BY McLean, Morton & Boustead
ATTORNEYS

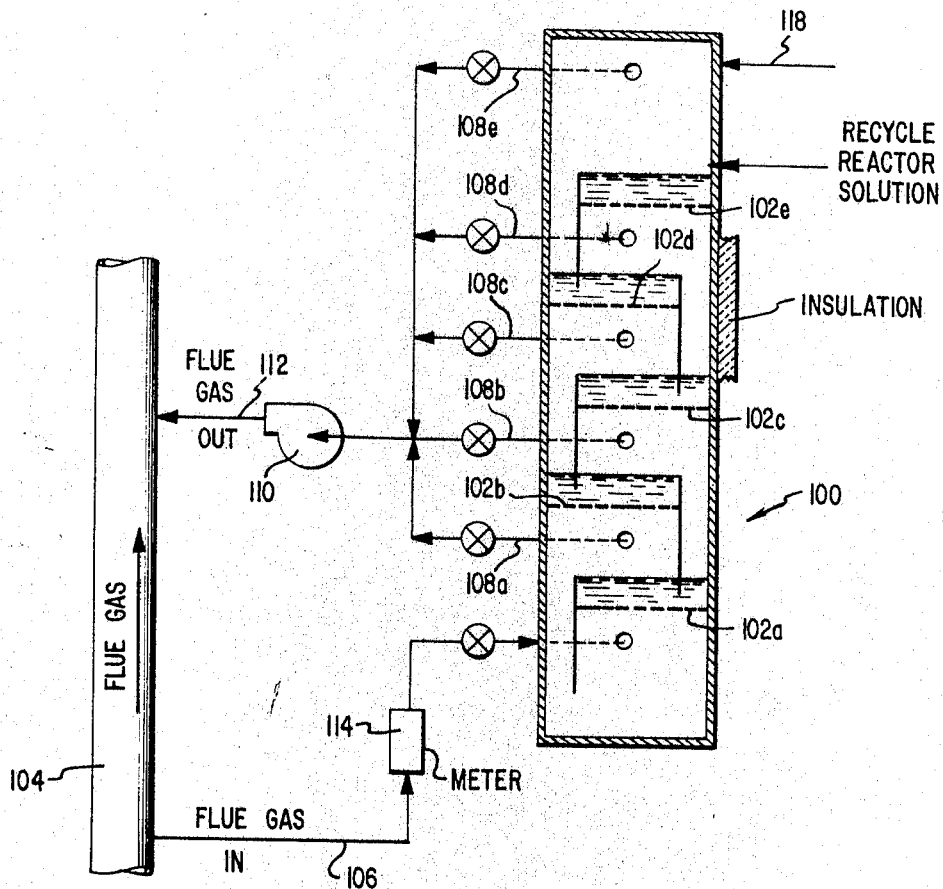

3,485,581
PROCESS FOR RECOVERING SULFUR DIOXIDE FROM GASES CONTAINING SAME
Leo A. Miller, Lakeland, and Jack D. Terrana, Tampa, Fla., assignors, by mesne assignments, to Wellman-Lord, Inc., Lakeland, Fla., a corporation of Florida
Filed Nov. 15, 1966, Ser. No. 594,477
Int. Cl. C01b 17/56, 17/90
U.S. Cl. 23—178                                                                 20 Claims

ABSTRACT OF THE DISCLOSURE

Sulfur dioxide is recovered from a gas containing same by scrubbing the gas with an aqueous solution of an alkali or alkaline earth metal monosulfite to convert the latter to the bisulfite, evaporating at least some of the water from the bisulfite solution at temperatures below the decomposition point of the bisulfite, and then heating the bisulfite to above its decomposition point to obtain $SO_2$ and the monosulfite, which can be recycled. During the evaporation step it is advantageous to replace the water being removed with an inert heat exchange material which is liquid under the evaporation zone conditions, the material being used in amounts sufficient to yield a slurry of the bisulfite in the material.

---

This invention relates to the recovery of sulfur dioxide from gases containing the same, and, more particularly, to a process for the recovery of sulfur dioxide from waste gases containing small concentrations thereof by reaction with, for example, sodium sulfite to produce sodium bisulfite and subsequent decomposition of the bisulfite to release sulfur dioxide.

According to existing practice, sulfur dioxide can be recovered from gases containing large concentrations thereof, e.g., 5 to 20 weight percent sulfur dioxide by cooling and scrubbing with water which dissolves the sulfur dioxide and then heating the resulting solution to drive off the sulfur dioxide. Gases containing such concentrations of sulfur dioxide can be produced, for example, by burning sulfur or sulfur-bearing ores with air. This process, however, requires large quantities of water and fuel and is correspondingly expensive since the solubility of sulfur dioxide in water is not very high and depends upon the percentage of sulfur dioxide in the gases and the temperature of the water used for absorption. Accordingly, this process is generally unsuitable for use with gases containing small concentrations of sulfur dioxide.

Sulfur dioxide is, however, found in large amounts as a constituent of many waste gases such as smelter gases, offgases from many chemical plants, and stack or furnace gases from coal-burning furnaces such as used in electric power plants, although its concentration in such gases is often less than 1 percent by weight. For example, a modern electric power plant of 1,350,000 kw. capacity will burn about 15,000 tons of coal per day. Much coal contains about 3.5 percent sulfur, or even more. The emission of sulfur dioxide from a plant of this size using such coal would then amount to about 1,000 tons per day, although the concentration of sulfur dioxide in the stack gases would be very low, on the order of 0.3 percent. This invention permits recovery of such small amounts of sulfur dioxide from gases, e.g. waste gases, although it is not limited thereto and can be used to recover the much larger concentrations from such gases as discussed above.

In accordance with this invention the sulfur dioxide in the gas is reacted with an alkali or alkaline earth metal sulfite, e.g. sodium sulfite, potassium sulfite, calcium sulfite, etc., in aqueous solution to form the corresponding bisulfite and subsequently the bisulfite is decomposed to produce an aqueous solution of the sulfite and sulfur dioxide and water vapor which are drawn off and either cooled and compressed to provide a liquid product or sent to a sulfuric acid plant. The sulfite is recycled to the reaction zone wherein additional sulfur dioxide is absorbed by reaction with the sulfite.

The present invention is based upon the recognition that the reaction of sulfur dioxide and a metal sulfite in aqueous solution to produce the metal bisulfite is reversible upon control of the temperature. For example, with sodium sulfite, the two reactions which are utilized in this invention are:

I.
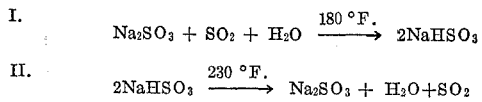

II.
$$2NaHSO_3 \xrightarrow{230\ °F.} Na_2SO_3 + H_2O + SO_2$$

For reaction of the metal sulfite and sulfur dioxide, e.g. Reaction I, to proceed, the temperature should be maintained above the temperature at which $SO_2$ is absorbed by reaction with the metal sulfite, preferably above about 100° F., and below the temperature, e.g. about 230° F. at which $SO_2$ is driven off such as by Reaction II. Preferably, the temperature is maintained below about 190° F., e.g. at about 180° F., or 185° F., since above this temperature Reaction I slows to a point where $SO_2$ will not be readily absorbed into solution. Decomposition of the metal bisulfite liquid, e.g. according to Reaction II is carried out at a temperature of above about 230° F., and up to about 600° F., preferably between about 300° and 400° F. Since some oxygen will be present in most flue gases, it is desirable to keep the decomposition temperature below the temperature at which the sulfite and oxygen react to produce the corresponding sulfate, e.g. below about 600° F. Oxidation inhibitors such as hydroquinone can be used to prevent oxidation. When using such an inhibitor and sodium sulfite, the temperature is preferably below about 400° F.

This invention will be described hereinbelow with reference to the use of sodium sulfite although, as mentioned above, it is not so limited. In general, therefore, an aqueous solution of sodium sulfite is fed to a reaction zone through which a gas containing sulfur dioxide is passed. This solution becomes saturated with sodium bisulfite and is withdrawn from the reaction zone and passed to a decomposition zone. The water content of the solution is preferably reduced before entry thereof into the decomposition zone and, to maintain a slurry, the water is replaced by an inert liquid heating medium such as Dowtherm or mineral oil. In the decomposition zone, the sodium bisulfite is decomposed and the resulting sulfur dioxide is collected. The resulting sodium sulfite is recycled to the reaction zone.

The present invention will be more fully understood from the following detailed description thereof when read in conjunction with the accompanying drawings in which:

FIGURE 1 is a flow sheet of preferred embodiment thereof, and

FIGURE 2 illustrates in detail a suitable reactor for use in FIGURE 1.

Referring now to FIGURE 1, a gas stream containing $SO_2$, e.g. flue gases from a power plant, is introduced into reactor 10 through line 12. $SO_2$ in the flue gas is absorbed in reactor 10 and the stripped flue gases exit from reactor 10 through line 14. $SO_2$ is absorbed from the flue gas by reaction with an aqueous solution of sodium sulfite to produce an aqueous sodium bisulfite solution. The aqueous sodium sulfite solution is introduced into reactor 10 through line 16 and the aqueous sodium bisulfite solution is removed through line 18.

Reactor 10 is, for example, a column designed for intimate contact of counter-currently flowing gas and liquid streams such as a packed tower or a plate tower containing bubble trays or sieve plates 102 such as shown in FIGURE 2. Tower 100 of FIGURE 2 illustrated five sieve plates 102a, b, c, d, and e although of course any desired number can be used. Flue gas is introduced at the bottom of tower 100 through line 106 from flue gas line 104 and passed upwardly through plates 102. The stripped flue gas is removed at the desired point in tower 100 via lines 108a, b, c, d and/or e. Blower 110 reintroduces the stripped gas into line 104 through line 112. Line 104, can, for example, be a feed line for a stack. Meter 114 in line 106 can be used to regulate the introduction of flue gas through line 106, if desired, to insure complete removal of $SO_2$. Tower 100 is jacketed and insulated. Steam is introduced into the jacket through line 118 to control the temperature of the solution in the tower.

The temperature of the solution in the reaction zone, i.e. reactor 10, is generally maintained sufficient to accomplish Reaction I above and insufficient to decompose the sodium bisulfite produced therein according to Reaction II, i.e., about 230° F. Temperatures of about 100° F. to about 180° F., or 190° F. are suitable for the reaction zone since above this level Reaction I slows and sulfur dioxide does not go readily into solution. Additionally, since the flue gas is passed upwardly countercurrent to the aqueous solution of sodium sulfite, it is desirable to maintain the temperature of the gases at a temperature sufficiently high that they will rise in the reaction zone, e.g., about 185° F.

The solution removed from reactor 10 is preferably a saturated solution of sodium bisulfite, and, accordingly the concentration of the solution is desirably maintained at just below saturation by the addition of sufficient water in the reaction zone to avoid precipitation of sodium bisulfite. The amount of solids in the sodium bisulfite solution will vary depending upon the temperature but at about 180° F. there will be between generally about 30 and 35 weight percent solids in the solution of which about 30 to 50 percent is sodium bisulfite and 50 to 70 percent is sodium sulfite. The aqueous sodium sulfite solution introduced into reactor 10 is preferably a recycle stream and, generally contains about 20 to 30 weight percent solids of which about 80 percent, and preferably 100 percent, is sodium sulfite and the balance essentially sodium bisulfite. This recycle stream is preferably a saturated solution of sodium sulfite. The temperature of the sodium sulfite solution is controlled to avoid upsetting the requirements of reactor 10 and is typically about 125° F. The aqueous sodium sulfite solution in line 16 not only includes a recycle stream of sodium sulfite from line 74 but also recycle water in line 44. Additional water can be added through line 80.

The aqueous sodium bisulfite solution removed from reactor 10 passes through line 18 to hold-up tank 20 and from tank 20 is pumped by 22 through line 24 to desorber 25 in the desorption zone. Desorber 25 functions to remove as much water as possible from the solution in line 24, e.g., about 50 percent, or more, without producing $SO_2$. The temperature of desorber 25 is controlled by reboiler 26 between a temperature sufficient to boil the water out of the solution and up to the temperature at which $SO_2$ is produced, e.g., up to about 225° F. or 230° F. An inert heating material, liquid at these temperatures, e.g., Dowtherm (a mixture of diphenyl and diphenyl oxide having a boiling pt. of 525° F.) or mineral oil, is introduced into desorber 25 through line 70 in an amount sufficient to maintain the sodium bisulfite in desorber 25 in slurry form. The inert liquid provides for even heating of the solution in desorber 25 as well. Steam is removed from desorber 25 through line 28. The desorption zone also includes a second desorber 30 for removing the remaining water from the sodium bisulfite solution. The solution from desorber 25 is fed to desorber 30 through line 34 via pump 36. The temperature of desorber 30 is maintained, as in desorber 25, sufficiently high to drive off water but not so high as to produce $SO_2$. Reboiler 38 controls the temperature of the solution in desorber 30 and heat is conveniently supplied by the steam in line 28 from desorber 25. This steam then passes to flash drum 40 through line 42. Drum 40 separates and accumulates water and entrained solids, e.g., sodium bisulfite or sodium sulfite from the gases in line 42 and recycles them through line 44 to feed line 16 of reactor 10. The gases removed from drum 40 through line 46 are essentially $SO_2$ and steam. Steam and other gases, including some $SO_2$, are removed from desorber 30 through line 32 and combined with the flue gas in line 12 for introduction into reactor 10. The addition of water, i.e., steam, to reactor 10 at this point is desirable since the more water added, less solution water will be required from the solution in line 16 in producing sodium bisulfite. The concentration of the solution in reactor 10 should be kept below the saturation point of sodium bisulfite to avoid precipitation thereof.

The slurry withdrawn from desorber 30 through line 48 is essentially sodium bisulfite and the inert liquid heating medium since at least 70 percent, and preferably essentially all, of the water is removed from the slurry in desorber 30. The composition of this stream is used to determine the amount of heating liquid needed to be added in desorber 25 since a slurry is desired so that the material can be pumped from desorber 30. In general, a sufficient amount of heating liquid is added in desorber 25 to accomplish this purpose. The slurry in line 48 is pumped via pump 52 through heat exchanger 54, where it is heated to a temperature sufficient to decompose the sodium bisulfite according to Reaction II above, e.g. 300° to 400° F. and then passed into reactor 50. The $SO_2$ and steam are flashed off in reactor 50 and removed through line 56 for combination with the gases in line 46 to form the $SO_2$ product stream 58. The $SO_2$ product stream can be used directly as feed for a sulfuric acid plant or the steam can be condensed and separated, and the $SO_2$ liquefied, as known in the art.

The slurry of inert heating liquid and sodium sulfite remaining in reactor 50 is removed through line 60 and conveyed to hold-up tank, or decanter 62 for separation. A portion of the slurry is, however, recycled through line 64 and combined with the slurry in line 48 to assist in heating this slurry. When Dowtherm is used as the inert heating liquid, the Dowtherm and sodium sulfite will form two layers in decanter 62, i.e. an upper Dowtherm layer 66 and a sodium sulfite layer 68. The Dowtherm in layer 66 is removed through line 70 and pumped 72 to the desorber 25. The sodium sulfite is removed through line 74 and pumped 76 for combination with line 16 and introduction in reactor 10. Make-up heating liquid and sodium sulfite can be introduced into tank 62 through line 78.

The following example, with reference to the above description, further illustrates the invention. A flue gas from coal-burning furnaces used in an electric power plant is scrubbed in an absorption tower or reactor 10 with an aqueous slurry of sodium sulfite containing initially about 25 weight percent solids including about 90 percent sodiumsulfite, the remainder being essentially sodium bisulfite. The temperature of tower 10 is operated to maintain the slurry therein at about 185° F. Typical composition of the flue gas in mole precent is: sulfur dioxide, 0.3; oxygen, 3.4; carbon dioxide, 14.2; nitrogen, 76.1; water, 6.0; and sulfur trioxide, trace. With a residence time of several minutes, about 90 to 95% of the $SO_2$ is removed from the flue gas. The slurry from tower 10, containing about 30 weight percent solids of which about 40 percent is sodium bisulfite, is then pumped to a two-stage desorption zone 25, and 30 where it is heated to about 225° F. to remove the water. Dowtherm is added during the first stage to supply heat. Sufficient Dowtherm is added to produce a slurry of the solids in the second stage. The resulting slurry of solids and Dowtherm is then heated in a decomposition zone 50 to about 350° F. The evolved $SO_2$ is collected. The Dowtherm and aqueous solution of sodium sulfite produced are decanted and the sodium sulfite solution is recycled to the absorption tower. The Dowtherm is recycled to the desorption zone.

It is claimed:

1. A process for the recovery of sulfur dioxide from a gas containing the same comprising contacting said gas containing sulfur dioxide with an aqueous solution of the sulfite of a metal selected from the group consisting of alkali metals and alkaline earth metals in a reaction zone to produce an aqueous solution of the bisulfite of said metal, said reaction zone being maintained at a temperature below the temperature at which the bisulfite of said metal decomposes to the metal sulfite, sulfur dioxide and water, recovering said solution of metal bisulfite and passing the solution through a desorption zone to substantially reduce the water content thereof, said desorption zone being maintained at a temperature above the boiling point of water in the solution and below the temeprature at which the bisulfite decomposes, recovering the metal bisulfite and passing the bisulfite through a decomposition zone maintained at a temperature above the temperature above the temperature at which the metal bisulfite decomposes to the metal sulfite, sulfur dioxide and water, and recovering the resulting sulfur dioxide.

2. The process of claim 1 wherein said reaction zone temperature is between about 100° F. and 230° F.

3. The process of claim 1 wherein said decomposition zone temperature is between about 230° F. and 600° F.

4. The process of claim 1 wherein said reaction zone temperature is between about 100° F. and 190° F.

5. The process of claim 1 wherein said decomposition zone temperature is between about 300° F. and 400° F.

6. The process of claim 1 wherein said metal is sodium.

7. The process of claim 1 wherein said metal is potassium.

8. The process of claim 1 wherein said metal is calcium.

9. A process for the recovery of sulfur dioxide from a gas containing the same comprising contacting said gas with an aqueous solution of the sulfite of a metal selected from the group consisting of alkali metals and alkaline earth metals in a reaction zone to produce an aqueous solution of the bisulfite of said metal, said reaction zone being maintained at a temperature below the temperature at which the metal bisulfite decomposes to the metal sulfite, sulfur dioxide and water, recovering said solution of metal bisulfite and passing the solution through a desorption zone, introducing into said desorption zone an inert heat exchange material which is liquid at the temperature of said desorption zone, said desorption zone being maintained at a temperature above the boiling point of water in the metal bisulfite solution and below the temperature at which the metal bisulfite decomposes to the metal sulfite, sulfur dioxide and water to substantially reduce the water content thereof, said inert material being added in a sufficient amount to form a slurry with said metal bisulfite after said water content is reduced, recovering the metal bisulfite slurry and passing the slurry through a decomposition zone maintained at a temperature above the temperature at which the metal bisulfite decomposes to the metal sulfite, sulfur dioxide and water, recovering the resulting sulfur dioxide, separating the inert material from the metal sulfite produced in said decomposition zone, recycling said metal sulfite to said reaction zone, and recycling said inert material to said desorption zone.

10. The process of claim 9 wherein the temperature of said desorption zone is less than about 230° F. and said material is Dowtherm.

11. The process of claim 9 wherein substantially all the water in said metal bisulfite solution is removed as vapor in the desorption zone.

12. The process of claim 11 wherein said desorption zone includes two sequentially arranged desorbers, each removing a portion of the water as vapor, and including heating the second desorber with the vapor produced in the first desorber, recycling the vapor from the second desorber to the reaction zone, separating entrained liquid in said vapor from the first desorber after heating said second desorber, and recycling the separated liquid to said reaction zone.

13. The process of claim 12 wherein said reaction zone temperature is between about 100° F. and 230° F.

14. The process of claim 13 wherein said decomposition zone temperature is between about 230° F. and 600° F.

15. The process of claim 9 wherein said reaction zone temperature is between about 100° F. and 230° F.

16. The process of claim 15 wherein said decomposition zone temperature is between about 230° F. and 600° F.

17. The process of claim 16 wherein said metal is sodium and the solution thereof added to the reaction zone is a substantially saturated solution, the solids content of which contains at least 80 weight percent sodium sulfite with the balance being essentially sodium bisulfite.

18. The process of claim 17 wherein the aqueous solution of sodium bisulfite produced in said reaction zone contains about 30 to 35 weight percent solids of which about 30 to 50 weight percent is sodium bisulfite and the balance essentially sodium sulfite.

19. The process of claim 18 wherein said feed gas contains less than 1 weight percent sulfur dioxide.

20. The process of claim 18 wherein said reaction zone temperature is between about 100° F. and 190° F. and said decomposition zone temperature is between about 230° F. and 400° F.

References Cited

FOREIGN PATENTS 134,555 11/1919 Great Britain.
489,745 8/1938 Great Britain.

OTHER REFERENCES

Chemical Engineering Progress, vol. 49, No. 7, p. 9.
Chertkov: Chem. Abstracts, vol. 55, p. 17116d (September 1961).

OSCAR R. VERTIZ, Primary Examiner

G. T. OZAKI, Assistant Examiner

U.S. Cl. X.R.

23—131, 177